United States Patent Office 3,497,024
Patented Feb. 24, 1970

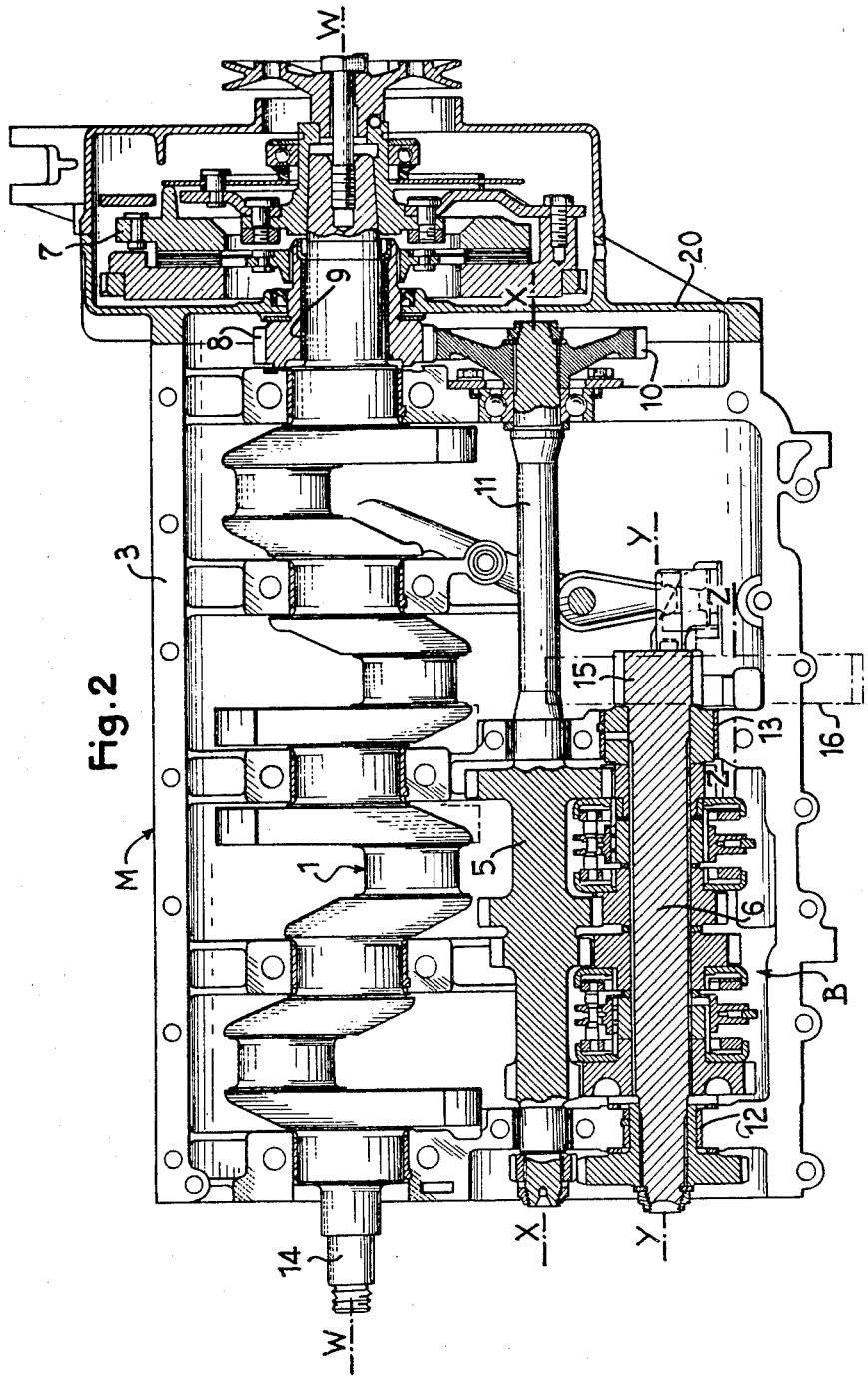

3,497,024
TRANSVERSE PROPELLING ENGINE UNIT FOR A VEHICLE OR THE LIKE
Hubert-Yves de Lavenne, Meudon-Bellevue, France, assignor to Automobiles Peugeot, Paris, France, and Regie Nationale des Usines Renault, Billancourt, France, both corporations of France
Filed Jan. 15, 1968, Ser. No. 697,799
Claims priority, application France, Mar. 3, 1967, 97,307
Int. Cl. B60k 9/00
U.S. Cl. 180—54                        3 Claims

ABSTRACT OF THE DISCLOSURE

An inclined transverse vehicle engine inclined in such manner that the axes of the cylinders are roughly horizontal and the axes of the crankshaft and primary and secondary shafts are parallel and contained in the same plane which is approximately perpendicular to the axes of the cylinders, the assembly of the engine and gearbox having an L-shaped configuration and the differential being located between the branches of the L so that the transmission shafts are at least approximately parallel to the axis of the crankshaft.

---

Figure 1:
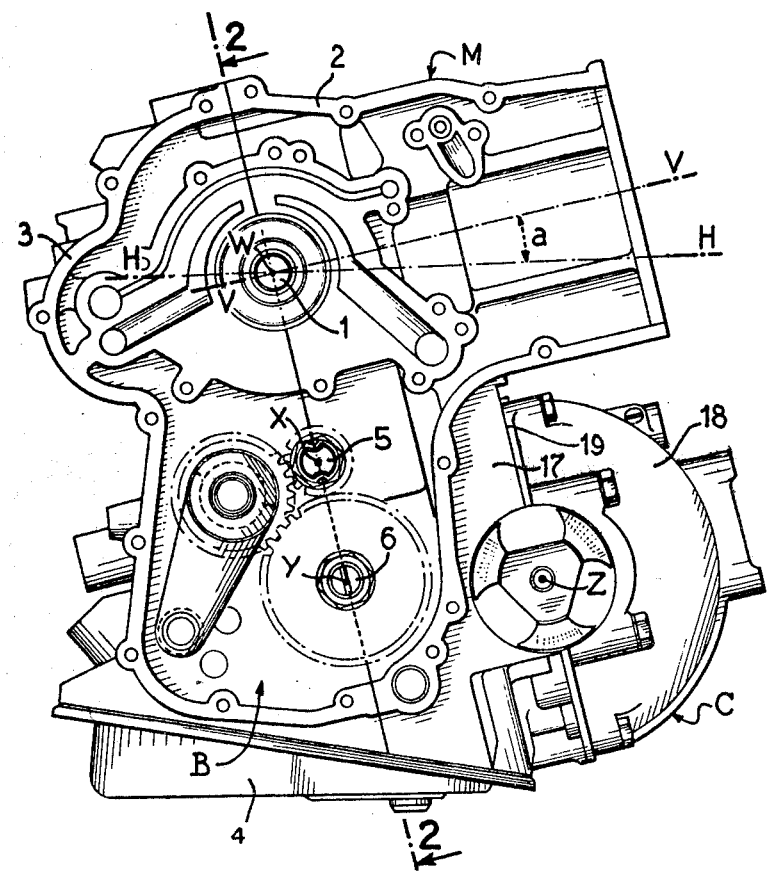

The present invention relates to propelling engine units for vehicles and other machines and the object of the invention is to provide a unit adapted to be placed transversely on the vehicle, this unit being as compact as possible and consequently having an extremely small overall size and very little weight for a given power.

This unit having an engine, gearbox and differential, is so arranged that the engine is inclined in such manner that the axes of the engine cylinders are roughly horizontal and the axes of the crankshaft and primary and secondary shafts of the engine are parallel and contained in the same plane which is approximately perpendicular to the axes of the cylinders of the engine, the assembly of the engine and gearbox having an L-shaped configuration and the differential being located between the branches of the L so that the axes of the transmission shafts leading to the wheels are at least approximately parallel to the axis of the crankshaft.

When the unit is in position on the vehicle, the engine is therefore transversely inclined onto the differential.

According to another feature, a main case in the shape of an inverted L constitutes the case of the engine and a half-case of the gearbox, and fixed on two plane opposed faces of this case are, outside the L, an auxiliary case forming the other half-case of the gearbox and also closing the engine case and replacing the crankshaft bearing caps, and, between the two branches of the L, a differential cover case.

Another object of the invention is to provide a vehicle comprising the aforementioned unit and in which the engine is inclined transversely of the vehicle.

Further features and advantages of the invention will be apparent from the ensuing description with reference to the accompanying drawings.

In the drawings:

FIG. 1 is a side elevational view of an improved unit according to the invention, the end cover common to the engine and the gearbox having been removed, and FIG. 2 is a longitudinal sectional view of the unit in a plane transverse to the vehicle intersecting the line 2—2 of FIG. 1.

In the illustrated embodiment, the propelling engine unit according to the invention is adapted to be disposed transversely on a vehicle or other machine. FIG. 1 is an end view in a direction perpendicular to the longitudinal plane of symmetry of the vehicle whose front end is located on the left of this figure. This compact unit comprises an assembly including an internal combustion engine M, a gearbox B and a differential C for driving two driving wheels, namely rear or front driving wheels, the latter being in this case driving and steering wheels.

The engine M is disposed transversely and inclined, the axes V—V of the cylinders being contained in a plane very close to the horizontal plane H—H, the angle $a$ (FIG. 1) between these two planes being for example around 10°.

The pistons (not shown) of these cylinders drive a crankshaft 1 having an axis W—W and adapted to be disposed horizontally and transversely of the vehicle. This crankshaft is journalled in bearings, halves of which are formed in a main case 2, the other halves being formed in an auxiliary case 3. The latter and case 2 are assembled at plane joint faces in the plane 2—2 (FIG. 1), the assembly of the two cases having an L-shaped configuration when seen in section. The joint plane 2—2 between the two cases is at least substantially perpendicular to the plane containing the axes V—V of the cylinders. The main case 2 forms in its upper part (FIG. 1) the case of the engine and in its lower part a semi-case of the gearbox B whereas the upper part of the semi-case 3 closes the engine and its lower part forms the other semi-case of the gearbox B. These cases define a single cavity common to the engine and the gearbox and constitute, upon assembly of their faces, not only the bearings of the crankshaft 1 but also those of the primary shaft 5 and secondary shaft 6 of the gearbox, these shafts having axes X—X and Y—Y which are contained in the plane 2—2 in the same way as the axis W—W of the crankshaft. Said cavity is closed at it lower end by a bottom plate or pan 4.

The gearbox P is of the mechanical type and is driven by the crankshaft 1 through a clutch 7 (FIG. 2) and a gear 8 is journalled on a bearing portion 9 of the crankshaft 1 and transmits the movement through a gear 10 keyed on the end of an extension 11 of the primary shaft 5 of the gearbox.

The secondary shaft 6 of this gearbox is preferably mounted, as shown, on bushings 12 and 13 which are lubricated under pressure by a pump (not shown) mounted on the end 14 of the crankshaft 1 and feeding all the bearings of the propelling engine unit.

The end of the output shaft 6 carries a gear 15 which is mounted in overhanging relation and directly drives the ring gear 16 of the differential C which is located between the two branches of the L formed by the engine M and the gearbox B. The axis X—X of the ring gear 16 is parallel to the axis W—W of the crankshaft and is therefore transversely disposed with respect to the vehicle in the same way as the transmission shafts leading to the wheels.

The differential C is located in a case formed by the combination of a portion 17 of the case 2, which is therefore common not only to the engine and the gearbox, but also the differential C and a rear cover case 18 assembled with the portion 17 of the case 2 in a joint plane 19 which intersects the axis Z—Z and is preferably parallel to the plane 2—2.

The assembly is closed at one of its ends by the clutch case 20 and at the other end by a distribution case (not shown).

As can be seen in FIG. 1, the assembly is extremely compact while very easy to assemble owing to the arrangement of the cases 2, 3 and 18 whose disposition also provides excellent rigidity for the caps of the crankshaft bearings which are integrated into the case 3 closing the engine and gearbox.

Having now described my invention what I claim as new and desire to secure by Letters Patent is:

1. A transverse propelling unit for an automobile vehicle or other machine, including an engine, a gearbox and a differential, wherein the engine is inclined in such manner that the plane containing the axes of the engine cylinders is roughly horizontal and the axes of the crankshaft and primary and secondary shafts of the gearbox are parallel and contained in the same plane which is approximately perpendicular to the plane containing the axes of the cylinders of the engine, the assembly of the engine and gearbox having an L-shaped configuration and the differential being located between the branches of the L so that the axes of the transmission shafts leading to the wheels are at least approximately parallel to the axis of the crankshaft, said unit comprising a main case in the shape of an inverted L constituting the case of the engine and a semi-case of the gearbox, an auxiliary case fixed on a face of said main case, constituting the other semi-case of the gearbox and closing the engine case a cover-case for said differential fixed on an opposite face of said main case between two branches of the L.

2. A transverse propelling unit as claimed in claim 1, wherein the main case and the auxiliary case are assembled at plane joint faces in said plane containing the axes of the crankshaft and primary and secondary shafts of the gearbox, said main and auxiliary cases defining in said plane joint faces bearings for said crankshaft, primary and secondary shafts, respectively.

3. A transverse propelling unit as claimed in claim 1, wherein the differential cover-case is mounted on said main case at a plane substantially parallel to said plane containing the axes of the crankshaft and the primary and secondary shafts of the gearbox.

References Cited

UNITED STATES PATENTS

| | | | |
|---|---|---|---|
| 638,331 | 12/1899 | Grant | 180—54 |
| 1,165,848 | 12/1915 | Chiville | 180—56 |
| 1,353,156 | 9/1920 | Ford | 180—54 |
| 2,265,078 | 12/1941 | Marsh | 180—54 |
| 2,782,864 | 2/1957 | Fessia | 180—55 |

FOREIGN PATENTS 381,331    9/1923    Germany.

LEO FRIAGLIA, Primary Examiner

MILTON L. SMITH, Assistant Examiner